US011022775B2

(12) United States Patent
Ito

(10) Patent No.: US 11,022,775 B2
(45) Date of Patent: Jun. 1, 2021

(54) LENS APPARATUS AND OPTICAL APPARATUS

(71) Applicant: CANON KABUSHIKI KAISHA, Tokyo (JP)

(72) Inventor: Hiroki Ito, Hiratsuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 177 days.

(21) Appl. No.: 16/257,168

(22) Filed: Jan. 25, 2019

(65) Prior Publication Data

US 2019/0235204 A1 Aug. 1, 2019

(30) Foreign Application Priority Data

Jan. 30, 2020 (JP) .............................. JP2018-013859

(51) Int. Cl.
*G02B 15/14* (2006.01)
*G02B 7/10* (2021.01)
*G02B 13/06* (2006.01)
*G02B 7/02* (2021.01)
*G02B 13/02* (2006.01)

(52) U.S. Cl.
CPC ............... *G02B 7/10* (2013.01); *G02B 7/021* (2013.01); *G02B 7/023* (2013.01); *G02B 13/02* (2013.01); *G02B 13/06* (2013.01)

(58) Field of Classification Search
CPC .......... G02B 5/201; G02B 5/22; G02B 5/223; G02B 5/20; G02B 5/003; G02B 5/208; G02B 1/04; G02B 1/041; B82Y 20/00; B82Y 10/00; B82Y 30/00; B82Y 40/00; B82Y 5/00; G02F 1/133514; G02F 1/133516; G02F 1/133512; G02F 1/13394; G02F 2203/52; G03F 7/027; G03F 7/031; G03F 7/105; G03F 7/0035; G03F 7/0007

USPC ....................................................... 359/885

See application file for complete search history.

(56) References Cited

U.S. PATENT DOCUMENTS

2017/0153412 A1* 6/2017 Ohmori .................... G02B 7/10

FOREIGN PATENT DOCUMENTS

JP          10-253867 A          9/1998

* cited by examiner

*Primary Examiner* — William R Alexander
*Assistant Examiner* — Tamara Y. Washington
(74) *Attorney, Agent, or Firm* — Cowan, Liebowitz & Latman, P.C.

(57) ABSTRACT

A lens barrel includes a first guide barrel configured to guide linear movements of a first lens and a second lens in an optical axis direction, a first cam barrel rotatable around an optical axis relative to the first guide barrel and including a first cam configured to move the first lens in the optical axis direction by a rotation of the first cam barrel, and a second cam barrel rotatable around the optical axis relative to the first guide barrel by the rotation of the first cam barrel, and including a second cam configured to move the second lens in the optical axis direction by a rotation of a second cam barrel.

11 Claims, 12 Drawing Sheets

LENS APPARATUS AND OPTICAL APPARATUS

BACKGROUND OF THE INVENTION

Field of the Invention

The present invention relates to a lens barrel and an optical apparatus using the same, such as an interchangeable lens and an imaging apparatus.

Description of the Related Art

Some lens barrels have a zoom mechanism configured to change an imaging angle of view by moving a plurality of lens units in an imaging optical system in an optical axis direction (or by changing intervals among the plurality of lens units). It is necessary for a higher zoom magnification in this lens barrel to increase a moving amount of each lens unit. In this case, it is necessary to increase a rotating amount of a cam barrel from a wide-angle end to a telephoto end so that the user can rotate the cam barrel with a small operation torque and greatly move each lens unit, but consequently the number of cams in one cam barrel is limited.

Hence, when more lens units are moved, as in a lens barrel disclosed in Japanese Patent Laid-Open No. 10-253867, part of a plurality of movable lens units is moved using a two-stage cam barrel. More specifically, a first cam barrel is rotated around an optical axis, a cam in the first cam barrel moves a second cam barrel disposed inside the first cam barrel in the optical axis direction and rotates it around the optical axis, and a cam in the second cam barrel moves the lens unit in the optical axis direction.

However, the above two-stage cam barrel causes an outer diameter of the lens barrel to be larger.

SUMMARY OF THE INVENTION

The present invention provides a lens barrel which can move a plurality of lens units while preventing an outer diameter from increasing.

A lens barrel according to one aspect of the present invention includes a first guide barrel configured to guide linear movements of a first lens and a second lens in an optical axis direction, a first cam barrel rotatable around an optical axis relative to the first guide barrel and including a first cam configured to move the first lens in the optical axis direction by a rotation of the first cam barrel, and a second cam barrel rotatable around the optical axis relative to the first guide barrel by the rotation of the first cam barrel, and including a second cam configured to move the second lens in the optical axis direction by a rotation of a second cam barrel.

An optical apparatus including the above lens barrel also constitutes another aspect of the present invention.

Further features of the present invention will become apparent from the following description of exemplary embodiments with reference to the attached drawings.

DESCRIPTION OF THE EMBODIMENTS

Figure 1:
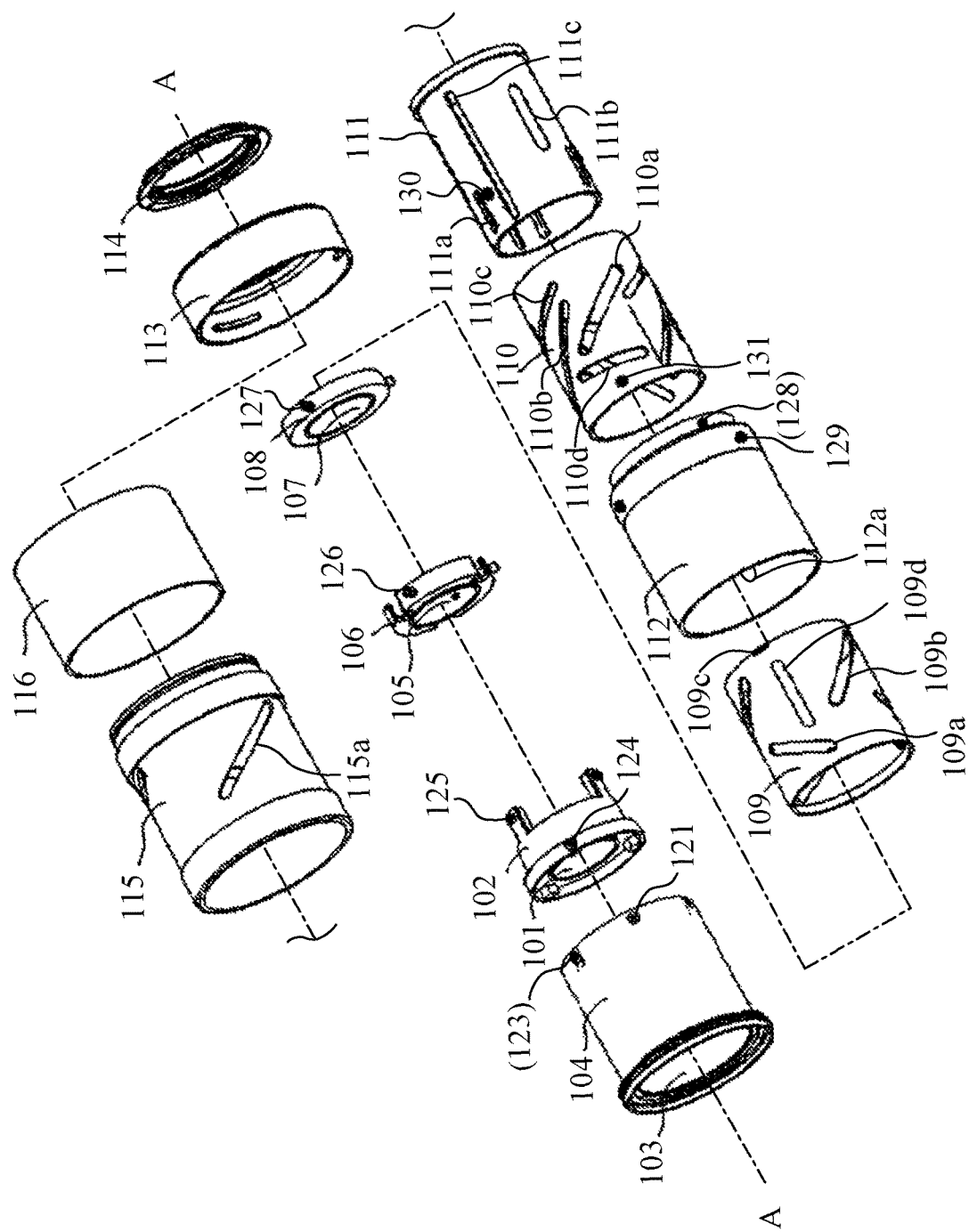
FIG. 1 is an exploded perspective view of a lens barrel according to an embodiment of the present invention.
Figure 2:
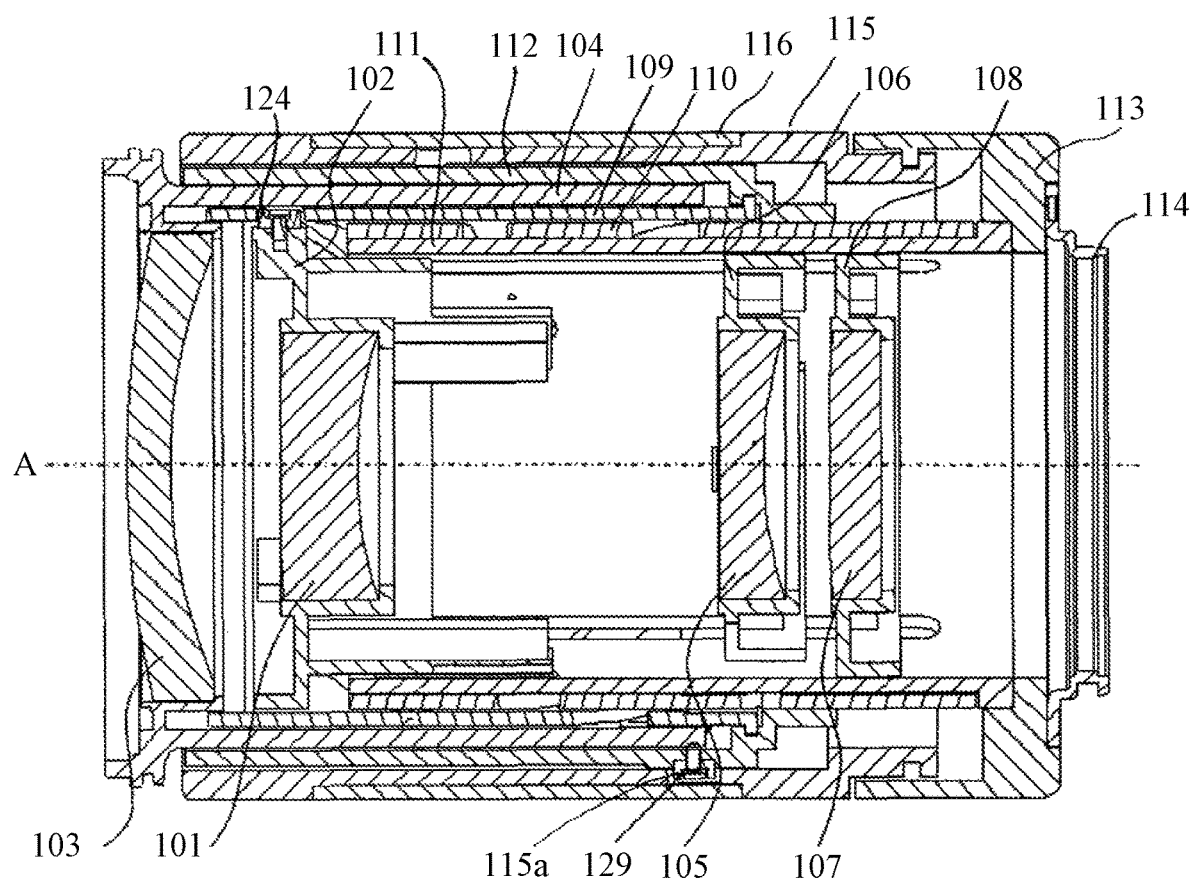
FIG. 2 is a sectional view of the lens barrel in a wide-angle state according to the embodiment.
Figure 3:
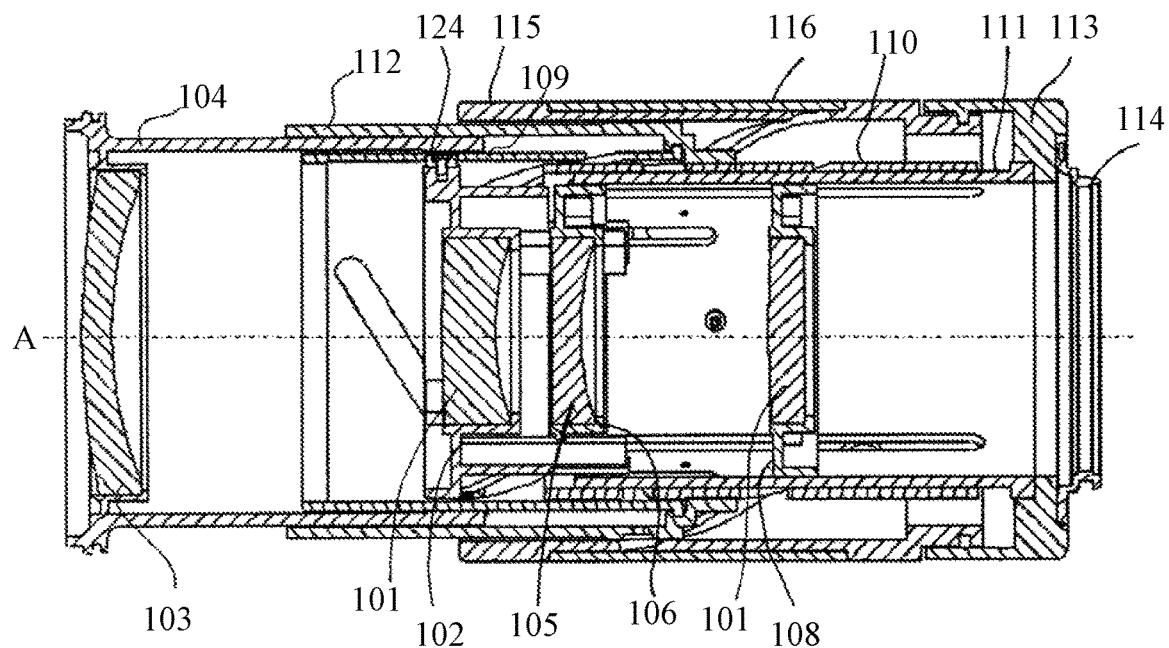
FIG. 3 is a sectional view of the lens barrel in a telephoto state according to the embodiment.

Referring now to the accompanying drawings, a description will be given of embodiments according to the present invention. FIG. 1 is an exploded view of a lens barrel according to one embodiment of the present invention. An interchangeable lens as an optical apparatus is configured with the lens barrel. A lens barrel having the same structure as that in this embodiment may be used for a lens integrated camera as an optical apparatus. FIGS. 2 and 3 illustrate sections of the wide-angle (end) state and the telephoto (end) state in the lens barrel according to this embodiment. In the figure, A is an optical axis of a lens barrel (or an imaging lens described later), and a direction in which the optical axis A extends will be referred to as an optical axis direction. A direction orthogonal to the optical axis direction will be referred to as a radial direction, and a direction around the optical axis will be also referred to as a circumferential direction or a rotating direction.

A description will now be given of a configuration of the imaging lens held by the lens barrel. The imaging lens includes, in order from an object side to an image side, a first lens unit 103, a second lens unit 101, a third lens unit 105, and a fourth lens unit 107. The third lens unit 105 and the fourth lens unit 107 correspond to a first lens including a plurality of lens units, and the second lens unit 101 corresponds to a second lens. The first lens unit 103 corresponds to a third lens.

Reference numeral 104 denotes a linear movement barrel (or cylinder) configured to hold the first lens unit 103, and reference numeral 102 denotes a second lens holder configured to hold the second lens unit 101. Reference numeral 106 denotes a third lens holder configured to hold the third lens unit 105, and reference numeral 108 denotes a fourth lens holder configured to hold the fourth lens unit 107.

Reference numeral 111 denotes a first guide barrel, and reference numeral 113 denotes a fixed barrel configured to fix the first guide barrel 111. A mount 114 detachably attached to an unillustrated lens interchangeable type camera is attached to the fixed barrel 113.

A first cam barrel 110 rotatable around the optical axis relative to the first guide barrel 111 and movable in the optical axis direction is disposed on the outer circumference of the first guide barrel 111. A second cam barrel 109 is provided on the outer circumference of the first cam barrel 110, rotatable around the optical axis by the rotation of the first cam barrel 110, and movable in the optical axis direction relative to the first cam barrel 110. A second guide barrel 112 is provided on the outer circumference of the second cam barrel 109, movable in the optical axis direction with the second cam barrel 109, configured to rotatably hold the second cam barrel 109, and spaced from the second cam barrel 109 in a radial direction. A linear movement barrel 104 is disposed in this space or gap.

An operating ring 115 bayonet-connected with a fixed barrel 113 on the outer circumference of the second guide barrel 112 and rotatably held around the optical axis at a fixed position in the optical axis direction. Rubber 116 is wound around the outer circumference of the operating ring 115 for a slip prevention when the user rotates the operating ring 115.

The first, second, third and fourth lens units 103, 101, 105, and 107 independently move in the optical axis direction for a magnification variation (zooming). This embodiment realizes a high zoom magnification, in particular, by setting a large moving amount (large extending amount) to the first lens unit 103. This embodiment can significantly extend the first lens unit 103 by the configuration that extends, relative to the first cam barrel 110, the second cam barrel 109 that extends the linear movement barrel 104.

A more detailed configuration of each cam barrel, each guide barrel, operating ring, and each holding barrel will be described below. The cam groove portions, the guide groove portions, and the cam followers, which will be described later, are provided at three positions at substantially regular intervals in the circumferential direction in each cam barrel, each guide barrel, the operating ring, and each lens holder.

Figure 4:
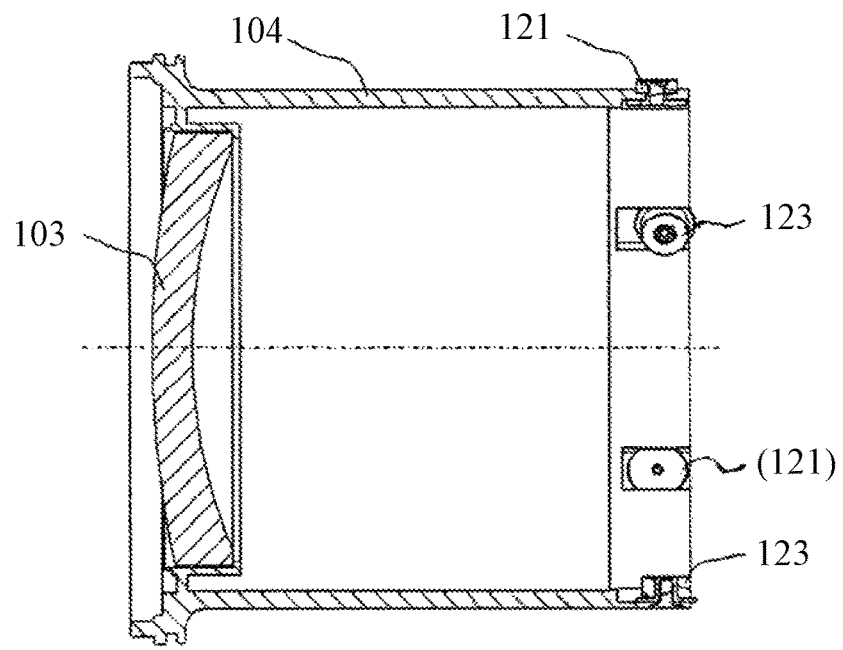
FIG. 4 is a sectional view of a linear movement barrel according to the embodiment.

FIG. 4 illustrates a section of the first lens unit 103 and the linear movement barrel 104 holding the same. A first linear movement follower 121 is provided on the outer circumferential portion of the linear movement barrel 104. A first cam follower 123 is provided on the inner circumferential portion of the linear movement barrel 104.

Figure 5:
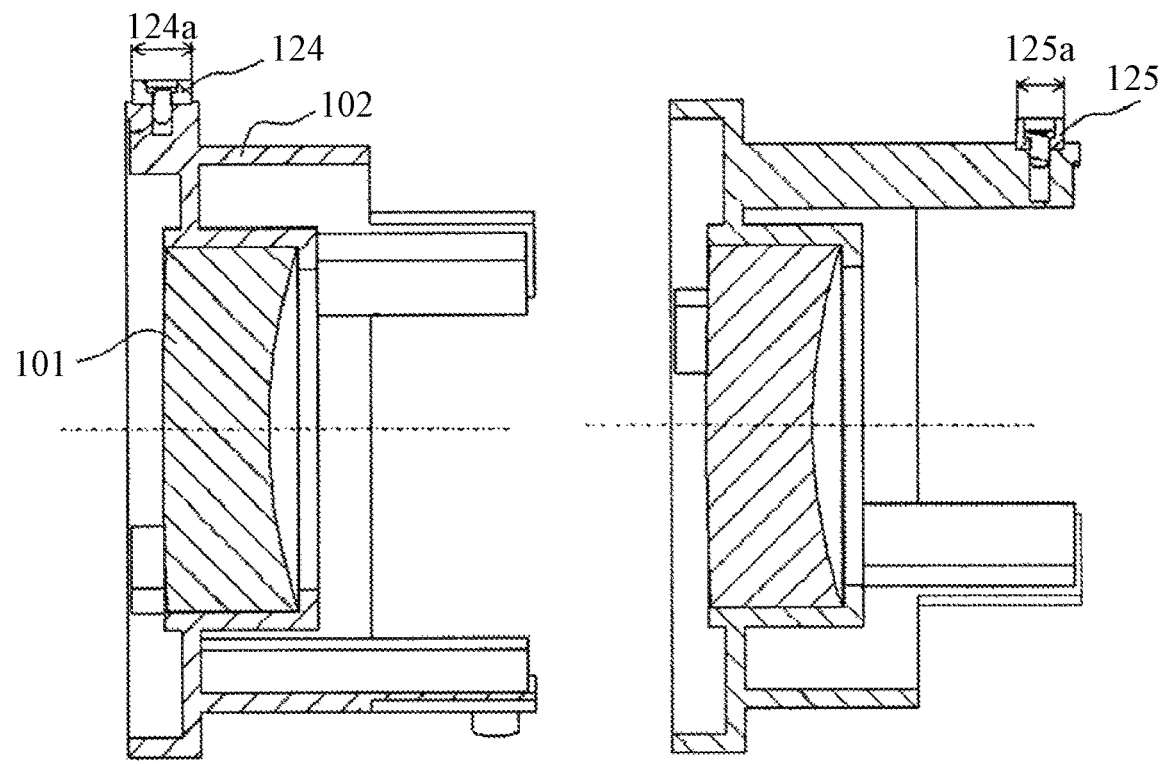
FIG. 5 is a sectional view of a second lens holder according to the embodiment.

FIG. 5 illustrates a section of the second lens unit 101 and the second lens holder 102 holding it. A left view of FIG. 5 illustrates a section containing the second cam follower 124 in which the second lens unit 101 and the second lens holder 102 are provided on the front side (object side) of the outer circumferential portion of the second lens holder 102. A right view illustrates a section containing a second linear movement follower 125 provided on a rear side (image side) of the outer circumferential portion of the second lens holder 102.

The second cam follower 124 and the second linear movement follower 125 have a first cylindrical portion 124a and a second cylindrical portion 125a, and an outer diameter of the first cylindrical portion 124a is set larger than an outer diameter of the second cylindrical portion 125a. An external force (impact) may be applied to the interchangeable lens from the object side to the image side. In this case, a second cam follower 124 engaged with a second cam groove portion 109a tilted to the optical axis direction receives a force larger than a second linear movement follower 125 engaged with a second guide groove portion 111a (described later) extending in the optical axis direction. The outer diameter of the second cam follower 124 is made larger than the outer diameter of the second linear movement follower 125 so as to prevent the second cam follower 124 from deforming (crushing) due to the external force.

The second linear movement follower 125 and the second cam follower 124 are provided with mutually different phases in the circumferential direction of the second lens holder 102. The reason for this configuration will be described later.

Figure 6:
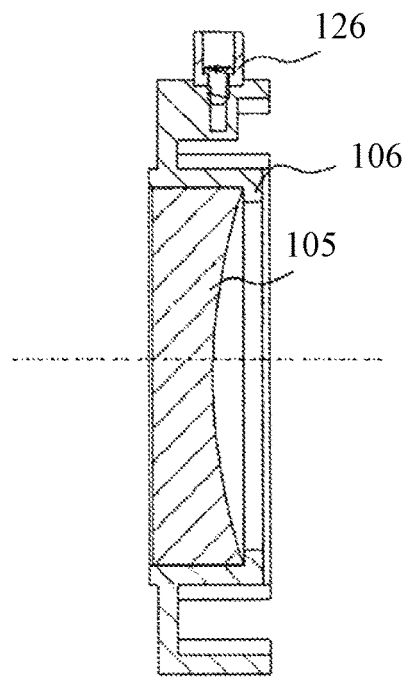
FIG. 6 is a sectional view of a third lens holder according to the embodiment.
Figure 7:
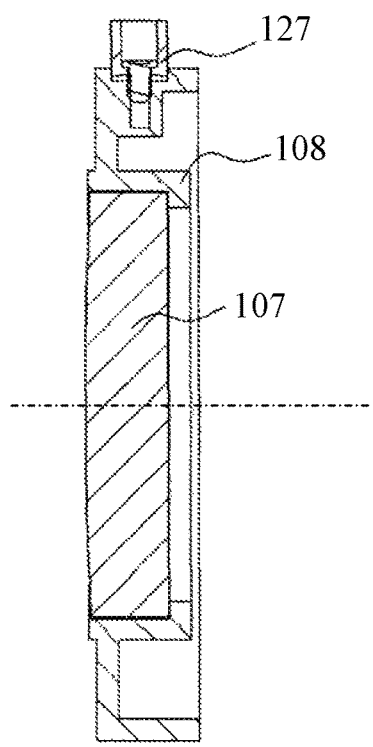
FIG. 7 is a sectional view of a fourth lens holder according to the embodiment.

FIG. 6 illustrates a section of the third lens unit 105 and the third lens holder 106 holding it. A third cam follower 126 is provided on the outer circumferential portion of the third lens holder 106. FIG. 7 illustrates a section of the fourth lens unit 107 and the fourth lens holder 108 holding it. A fourth cam follower 127 is provided on the outer circumferential portion of the fourth lens holder 108.

Figure 8:
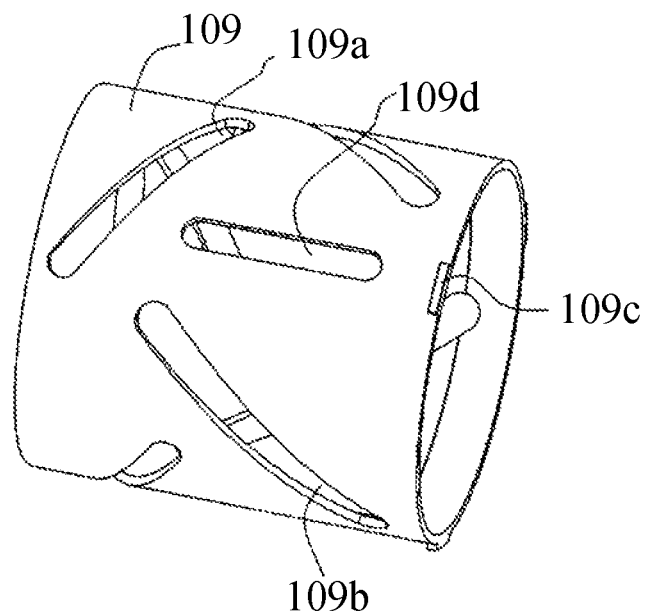
FIG. 8 is a perspective view of a second cam barrel according to the embodiment.

FIG. 8 is a perspective view of the second cam barrel 109. The second cam barrel 109 includes a first cam groove portion 109b engaged with the first cam follower 123 in the linear movement barrel 104 and a second cam groove portion 109a engaged with the second cam follower 124 in the second lens holder 102. The second cam groove portion 109a corresponds to the second cam.

The second cam barrel 109 includes a rotation connecting groove portion 109d engaged with a rotation connecting pin 131 provided to the first cam barrel 110, as described later. The rotation connecting groove portion 109d linearly extends in the optical axis direction. The rotation connecting pins 131 and the rotation connecting groove portions 109d are provided at three positions at substantially regular intervals in the circumferential direction in the first and second cam barrels 110 and 109.

The second cam barrel 109 includes bayonet claws 109c at three positions at substantially regular intervals in the circumferential direction at the outer circumferential rear end portion thereof. These bayonet pawls 109c are engaged with bayonet grooves 112b formed so as to extend in the circumferential direction at the inner circumferential rear end portion of the second guide barrel 112. Thereby, the second guide barrel 112 holds the second cam barrel 109 so as to be movable integrally in the optical axis direction and rotatable around the optical axis.

Figure 9:
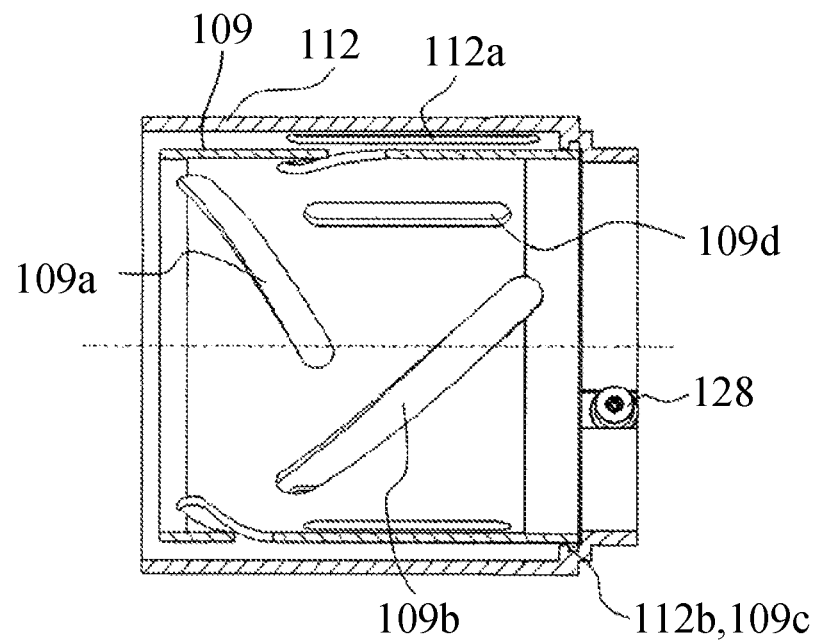
FIG. 9 is a sectional view of the second cam barrel and a second guide barrel according to the embodiment.
Figure 10:
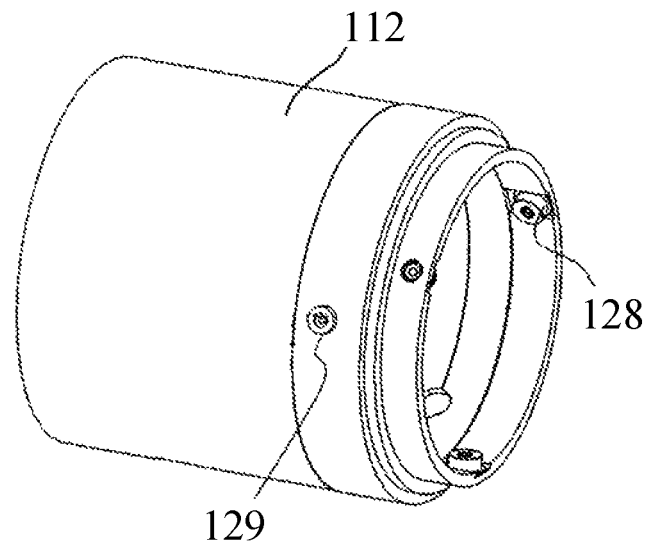
FIG. 10 is a perspective view of the second guide barrel according to the embodiment.
Figure 11:
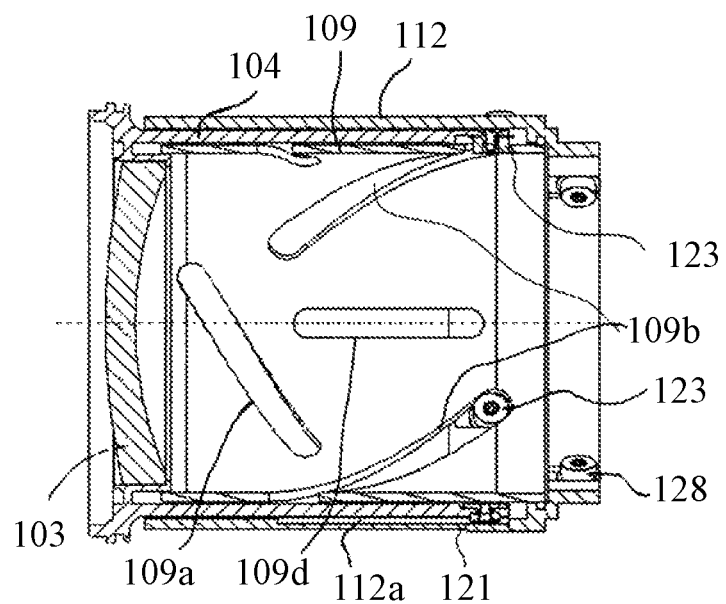
FIG. 11 is a sectional view of the linear movement barrel and the second cam barrel according to the embodiment.

FIG. 9 illustrates a section when the second cam barrel 109 is incorporated into the second guide barrel 112. FIG. 10 is a perspective view of the second guide barrel 112. FIG. 11 illustrates a section when the linear movement tube 104 is disposed between the second guide barrel 112 and the second cam barrel 109. A sixth cam follower 128 is provided at the inner circumferential rear end portion of the second guide barrel 112. The sixth cam follower 128 is engaged with the sixth cam groove portion 110a provided on the first cam barrel 110. The sixth cam groove portion 110a and the sixth cam follower 128 constitute a first cam mechanism.

As described above, the first cam follower 123 provided to the linear movement barrel 104 is engaged with the first cam groove portion 109b in the second cam barrel 109. A first linear follower 121 provided on the linear movement barrel 104 is engaged with a first guide groove portion 112a (FIG. 11) provided at the inner circumferential portion of the second guide barrel 112. This configuration rotates the second cam barrel 109 around the optical axis, and linearly moves the linear movement barrel 104 in the optical axis direction.

This embodiment arranges, in order from a radially inner side, the second cam barrel 109, the linear movement barrel 104, and the second guide barrel 112. In other words, the linear movement barrel 104 is held between the second cam barrel 109 and the second guide barrel 112. Thereby, as will be described later, when the second guide barrel 112 is extended in the optical axis direction relative to the first guide barrel 111, the outer circumferential surface of the second guide barrel 112 becomes an external surface of the lens barrel. The first guide groove portion 112a in the second guide barrel 112 is formed as a bottomed groove portion which opens radially inwardly and does not perforate the second guide barrel 112 in the radial direction. In other words, the first guide groove portion 112a is formed so as not to expose to the external appearance.

A zoom cam follower 129 is provided on the outer circumferential portion of the second guide barrel 112. The zoom cam follower 129 is engaged with a zoom cam groove portion 115a provided on the inner circumferential portion of the operating ring 115.

Figure 12:
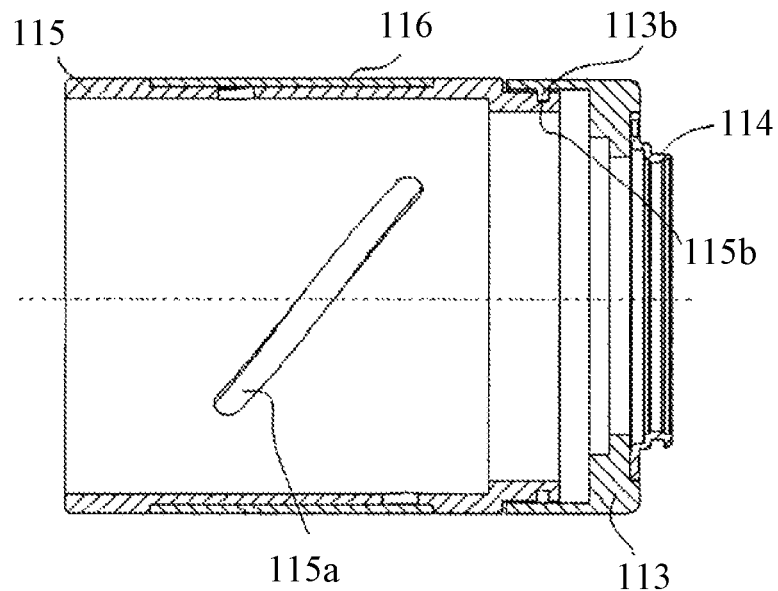
FIG. 12 is a sectional view of an operating ring according to the embodiment.

FIG. 12 illustrates a section of the fixed barrel 113 to which the operating ring 115 around which the rubber 116 is wound and the mount 114 are attached. The operating ring 115 is held rotatably around the optical axis at a fixed position in the optical axis direction by the fixed barrel 113 because bayonet claws 113b provided at three positions at substantially regular intervals in the circumferential direction of the fixed barrel 113 are engaged with a bayonet groove portion 115b formed so as to extend in the circumferential direction at the outer circumferential rear end portion. The operating ring 115 has a zoom cam groove portion 115a. As illustrated in FIG. 2, the zoom cam follower 129 provided in the second guide barrel 112 is engaged with the zoom cam groove portion 115a. The zoom cam groove portion 115a and the zoom cam follower 129 constitute a third cam mechanism.

Figure 13:
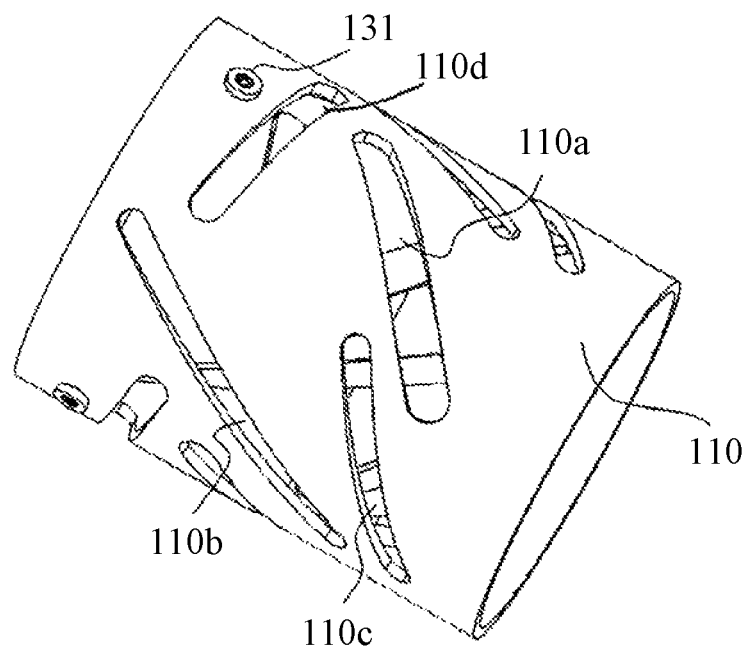
FIG. 13 is a perspective view of a first cam barrel according to the embodiment.
Figure 14:
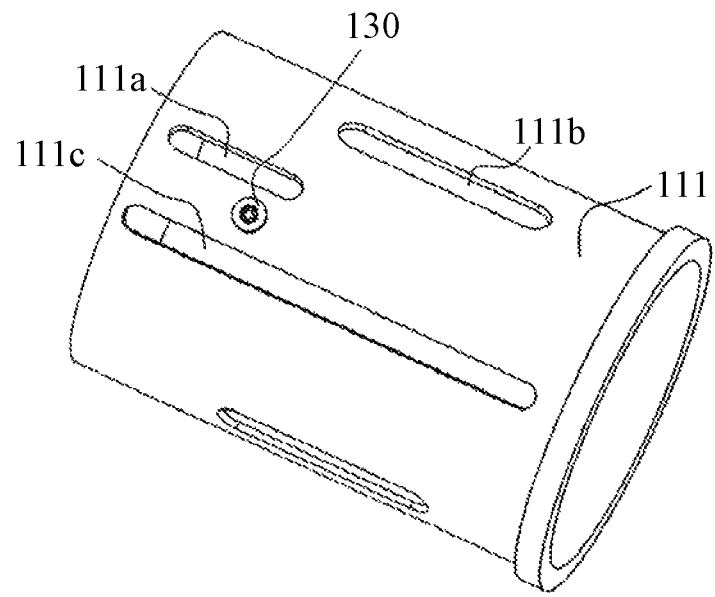
FIG. 14 is a perspective view of a first guide barrel according to the embodiment.
Figure 15:
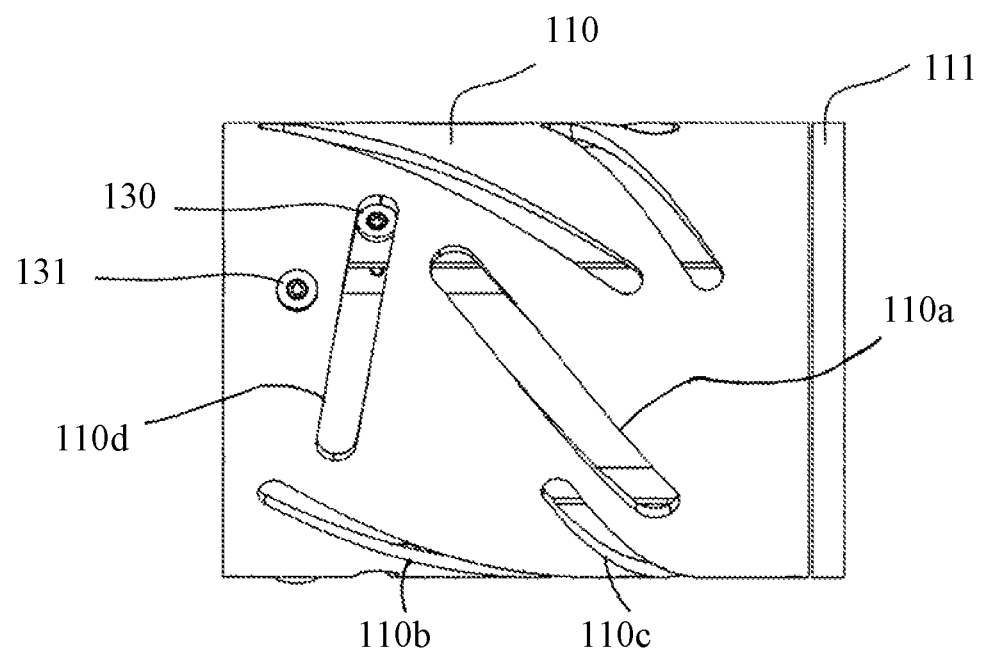
FIG. 15 is a side view of the first guide barrel and the first cam barrel in the wide-angle state according to the embodiment.
Figure 16:
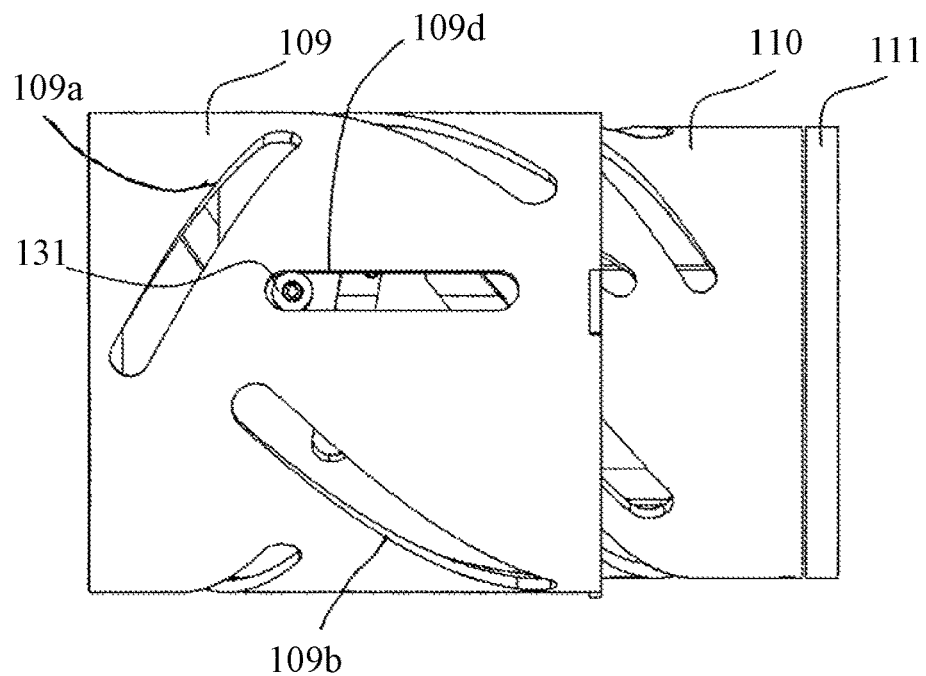
FIG. 16 is a side view of the first guide barrel and the first cam barrel in the telephoto state according to the embodiment.

FIG. 13 is a perspective view of the first cam barrel 110, and FIG. 14 is a perspective view of the first guide barrel 111. FIG. 15 illustrates the first cam barrel 110 incorporated into the first guide barrel 111, and FIG. 16 illustrates the second cam barrel 109 assembled into the first guide barrel 111 and the first cam barrel 110.

As described above, the first cam barrel 110 includes the rotation connecting pin 131 at its outer circumferential portion engaged with the rotation connecting groove portion 109d provided in the second cam barrel 109, and a sixth cam groove portion 110a with which the sixth cam follower 128 of the second guide barrel 112 is engaged. The first cam barrel 110 further includes a third cam groove portion 110b engaged with the third cam follower 126 in the third lens holder 106, a fourth cam groove portion 110b engaged with the fourth cam follower 127 in the fourth lens holder 108, and a fourth cam groove 110c engaged with the fourth cam follower 127 in the fourth lens holder 108. The third cam groove portion 110b and the fourth cam groove portion 110c correspond to the first cam.

The first cam barrel 110 further includes a fifth cam groove portion 110d engaged with a fifth cam follower 130 provided on the outer circumferential portion of the first guide barrel 111. The fifth cam follower 130 and the fifth cam groove portion 110d constitute a second cam mechanism.

In addition to the fifth cam follower 130, the first guide barrel 111 further includes a second guide groove portion 111a engaged with the second linear movement follower 125 as a portion guided by the second lens holder 102, and a sixth guide groove portion 111b engaged with the sixth cam follower 128 in the guide barrel 112. The first guide barrel 111 further includes a third guide groove portion 111c engaged with the third cam follower 126 in the third lens holder 106 and the fourth cam follower 127 in the fourth lens holder 108.

Figure 17:
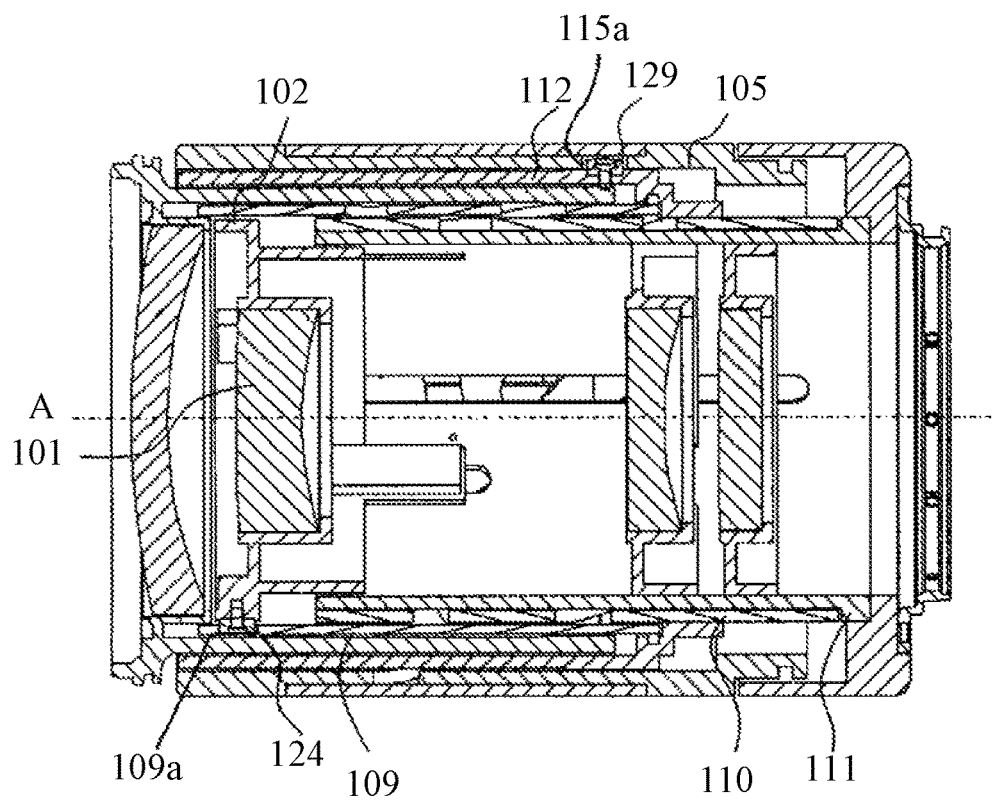
FIG. 17 is a sectional view containing a second cam follower in the lens barrel (wide-angle state) according to the embodiment.
Figure 18:
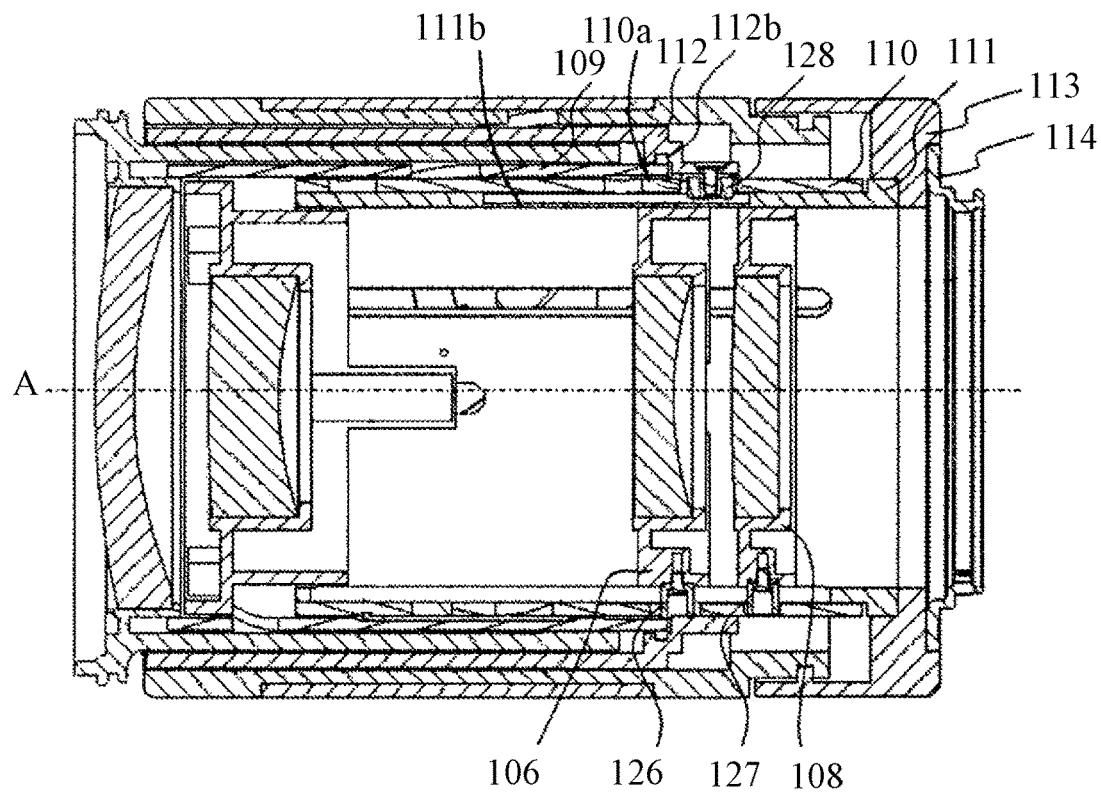
FIG. 18 is a sectional view containing a sixth cam follower in the lens barrel (wide-angle state) according to the embodiment.
Figure 19:
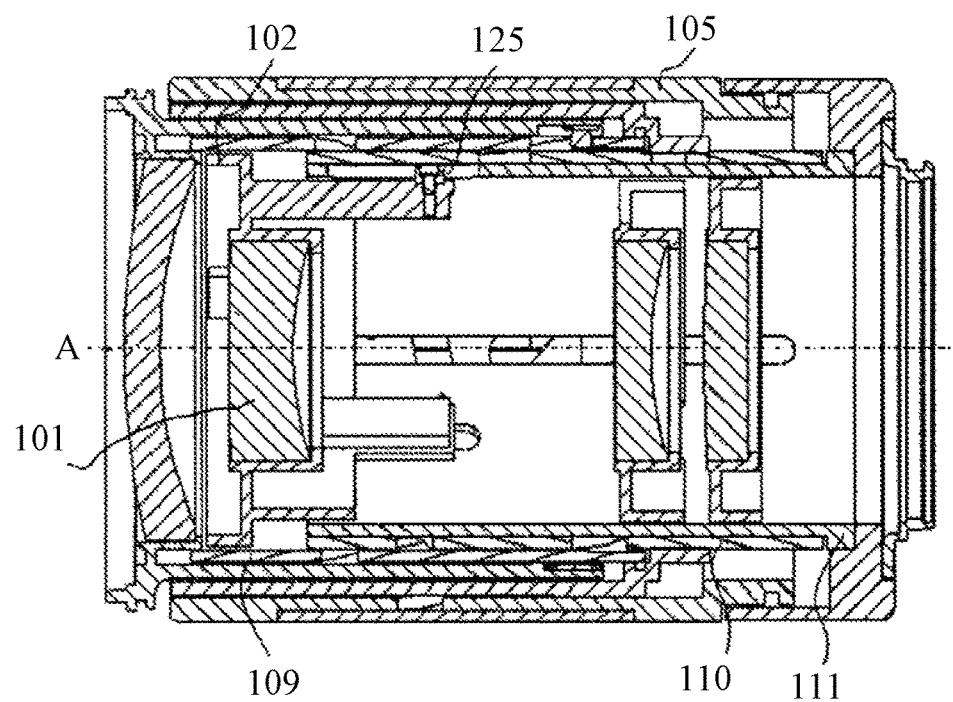
FIG. 19 is a sectional view containing a second linear movement follower in the lens barrel (wide-angle state) according to the embodiment.

FIGS. 17, 18 and 19 illustrate different sections of the lens barrel in the wide-angle state according to this embodiment. As illustrated in FIG. 17, the second cam follower 124 in the second lens holder 102 is engaged with the second cam groove portion 109a in the second cam barrel 109.

As the operating ring 115 is rotated, the zoom cam groove portion 115a generates a force for moving the second guide barrel 112 in the optical axis direction together with the zoom cam follower 129. Then, as illustrated in FIG. 18, the sixth cam follower 128 provided to the second guide barrel 112 is guided in the optical axis direction by the sixth guide groove portion 111b in the first guide barrel 111. Thereby, the second guide barrel 111 moves in the optical axis direction with the second cam barrel 109 integrated with the second guide barrel 111 in the optical axis direction. As illustrated in FIG. 18, since the sixth cam follower 128 is also engaged with the sixth cam groove 110a in the first cam barrel 110, as the second guide barrel 112 moves in the optical axis direction, the first cam barrel 110 rotates around the optical axis.

The first cam barrel 110 rotated and moved in the optical axis direction since the fifth cam groove portion 110d in the first cam barrel 110 is engaged with the fifth cam follower 130 provided on the outer circumferential portion in the first guide barrel 111. As the first cam barrel 110 rotates, the second cam barrel 109 is rotated around the optical axis by the engagement between the rotation connecting pin 131 and the rotation connecting groove portion 109d. The first cam follower 123 in the linear movement barrel 104 is pressed by the first cam groove portion 109b in the second cam barrel 109 that is rotated and moved in the optical axis direction, and the linear movement barrel 104 moves in the optical axis direction. Then, the linear movement barrel 104 (the first linear movement follower 121) is guided in the optical axis direction by the first guide groove portion 112a in the second guide barrel 112.

The interchangeable lens with a high zoom magnification needs to make the overall length in the shortest state (wide-angle state) as short as possible, and to secure a large moving amount of each lens unit in zooming. This embodiment adopts a configuration that moves both the first cam barrel 110 and the second cam barrel 109 in the optical axis direction in zooming, and secures a large moving amount of each lens unit while shortening the overall length in the shortest state.

As described above, the second cam follower 124 in the second lens holder 102 is engaged with the second cam groove portion 109a in the second cam barrel 109. As illustrated in FIG. 19, the second linear follower 125 in the second lens holder 102 is engaged with the second guide groove portion 111a in the first guide barrel 111. Hence, as the second cam barrel 109 rotates, the second lens holder 102 (the second lens unit 101) moves in the optical axis direction.

As described above, the third cam follower 126 in the third lens holder 106 and the fourth cam follower 127 in the fourth lens holder 108 are engaged with the third cam groove portion 110b and the fourth cam groove portion 110c in the first cam barrel 110. The third cam follower 126 and the fourth cam follower 127 are also engaged with the third guide groove portion 111c in the first guide barrel 111. Therefore, as the first cam barrel 110 rotates, the third lens holder 106 (the third lens unit 105) and the fourth lens holder 108 (the fourth lens unit 107) move in the optical axis direction.

Figure 20:
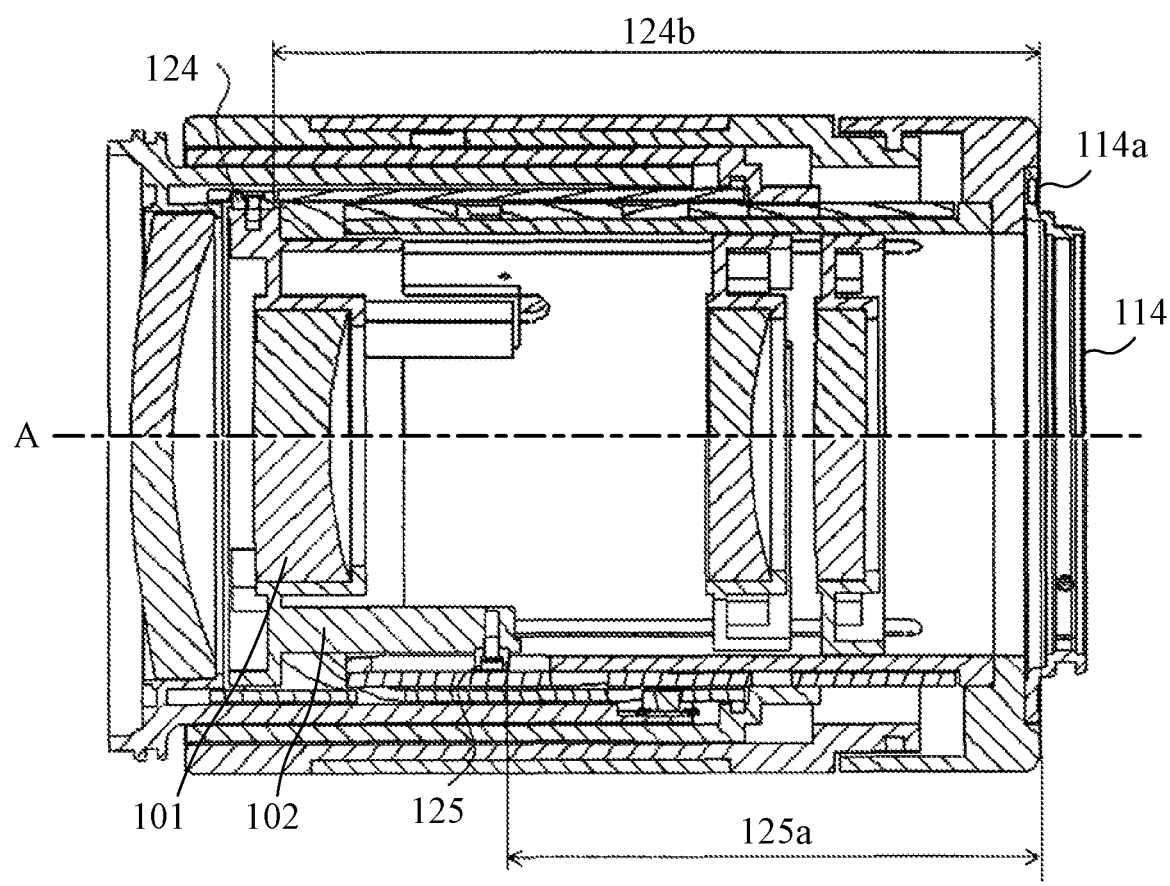
FIG. 20 is a sectional view of the lens barrel (wide-angle state) according to the embodiment.

FIG. 20 illustrates a section of the lens barrel in the wide-angle state according to this embodiment. A first section including the second cam follower 124 provided on the second lens holder 102 is illustrated above the optical axis A. FIG. 20 illustrates a second section containing the second linear movement follower 125 below the optical axis A. The first section and the second section have different phases in the circumferential direction.

In the wide-angle state, reference numeral 124b denotes a range from a mount reference surface 114a as a contact surface with the camera in the mount 114 to a mount side surface (contact surface with the second cam groove portion 109a) of a cylindrical portion 124a in the second cam follower 124. Reference numeral 125a denotes a range from the mount reference surface 114a to the mount side surface of the cylindrical portion in the second linear movement follower 125.

Figure 21:
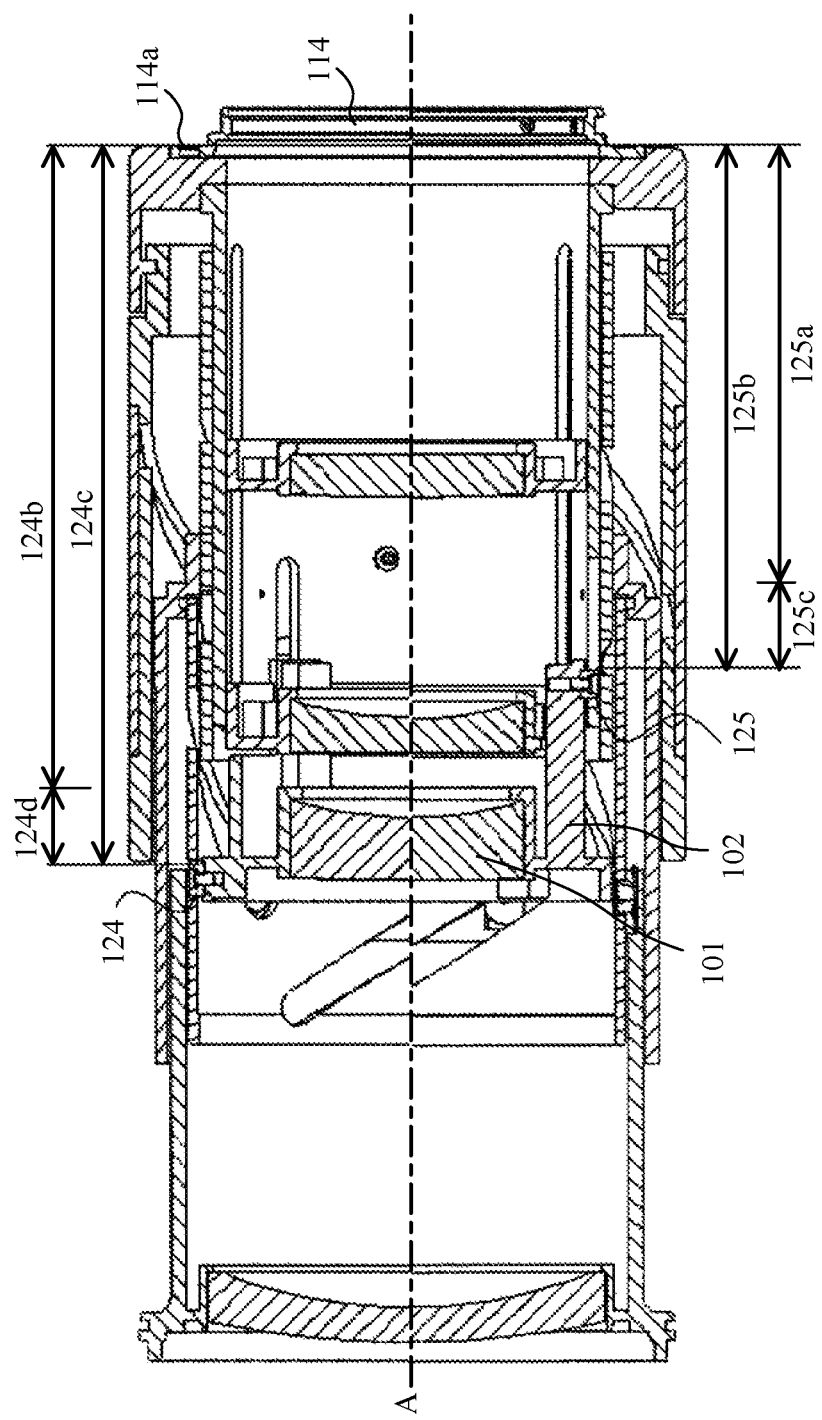
FIG. 21 is a sectional view of the lens barrel (telephoto state) according to the embodiment.

FIG. 21 illustrates a section of the lens barrel in a telephoto state according to this embodiment. FIG. 21 also illustrates the first section above the optical axis A, and the second section below the optical axis A. In the telephoto state, reference numeral 124c denotes a range from the mount reference surface 114a to the mount side surface of the cylindrical portion 124a in the second cam follower 124. Reference numeral 125b denotes a range from the mount reference surface 114a to the mount side surface of the cylindrical portion in the second linear movement follower 125. A first range 125c is a range obtained by subtracting the range 125a in the wide-angle state from the range 125b in the telephoto state. A second range (moving range of the second cam follower 124) 124d is a range obtained by subtracting the range 124b in the wide-angle state from the range 124c in the telephoto state.

The lens barrel according to this embodiment is configured such that the first range 121c and the second range 124d overlap each other in the optical axis direction with different arrangement phases around the optical axis. In this case, if it is attempted to set the second guide groove portion 111a engaged with the second linear movement follower 125 to have the same phase as that of the second cam groove portion 109a engaged with the second cam follower 124, the second cam groove portion 109a and the second guide groove portion 111a interfere each other since the second cam follower 124 and the second linear movement follower 125 overlap each other in a moving range in the optical axis direction.

This embodiment provides the second cam follower 124 to the second cam barrel 109, and the second guide groove portion 111a to the first guide barrel 111. The phases of the second cam follower 124 (the second cam groove portion 109 a) and the second linear movement follower 125 (the second guide groove portion 111a) are made different from each other in the circumferential direction. This configuration can avoid the interference between the second guide groove portion 111a and the second cam groove portion 109a.

It is conceivable that a configuration for moving the second lens holder 102 in the optical axis direction is made by providing the second cam groove portion 109a to the first cam barrel 110. The first cam barrel 110 includes many cam groove portions, such as the third and fourth cam groove portions 110b and 110c, the fifth cam groove portion 110d for moving the first cam barrel 110 itself in the optical axis direction, and the sixth cam groove portion 110a for rotating the barrel 110. The first cam barrel 110 further includes the rotation connecting pin 131 for rotating the second cam barrel 109. It is difficult for the space limitation to provide an additional cam groove portion to the first cam barrel 110, and the reduced strength of the first cam member 110 due to the addition of the cam groove portion may be concerned. When the second cam groove portion 109a is provided to the first cam barrel 110, and the third and fourth cam groove portions 110b and 110c are provided to another (third) cam barrel disposed on the inner circumference of the first cam barrel 110, the outer diameter of the lens barrel may be increased or larger.

On the other hand, this embodiment provides the second cam follower 124 to the second cam barrel 109 configured to move the linear movement barrel 104, and the second guide groove portion 111a to the first guide tube 111 configured to guide the third and fourth lens holders 106 and 108. This configuration can secure necessary moving amounts of the first to fourth lens units 103, 101, 105, and 107 while suppressing an increase in the outer diameter of the lens barrel.

While this embodiment has discussed the imaging lens including the four lens units, another imaging lens configuration may be adopted. While this embodiment omits a description of the operation of the lens unit for focusing, for example, if the imaging lens is a rear focus type lens, the third lens unit 105 and the fourth lens unit 107 may be moved in the optical axis direction for focusing. If the imaging lens is a front focus type lens, the first lens unit 103 is moved in the optical axis direction for focusing.

According to the above embodiment, the lens barrel that can move a plurality of lens units can be made smaller or reduced in diameter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-013859, filed on Jan. 30, 2018, which is hereby incorporated by reference herein in its entirety.

What is claimed is:

1. A lens barrel comprising:
    a first guide barrel configured to guide linear movements of a first lens and a second lens in an optical axis direction;
    a first cam barrel rotatable around an optical axis relative to the first guide barrel and including a first cam configured to move the first lens in the optical axis direction by a rotation of the first cam barrel;
    a second cam barrel rotatable around the optical axis relative to the first guide barrel by the rotation of the first cam barrel, and including a second cam configured to move the second lens in the optical axis direction by a rotation of a second cam barrel;
a linear movement barrel configured to hold a third lens; and
a second guide barrel whose linear movement in the optical axis direction is guided by the first guide barrel, the second guide barrel being configured to guide a linear movement of the linear movement barrel in the optical axis direction,
wherein the second cam barrel is rotatable around the optical axis relative to the first guide barrel and the second guide barrel and includes a third cam configured to move the linear movement barrel in the optical axis direction by a rotation of the third cam.

2. The lens barrel according to claim 1, wherein the second cam barrel is movable in the optical axis direction as the second guide barrel moves in the optical axis direction.

3. The lens barrel according to claim 1, wherein the second lens is held by a lens holder that includes a guided portion of the linear movement by the first guide barrel and a cam follower engaged with the second cam, and
wherein in the lens holder, the guided portion and the cam follower are provided with mutually different phases in a direction around the optical axis.

4. The lens barrel according to claim 3, wherein a moving range of the guided portion and a moving range of the cam follower overlap each other in the optical axis direction.

5. The lens barrel according to claim 3, wherein an outer diameter of the cam follower is larger than an outer diameter of the guided portion.

6. The lens barrel according to claim 1, wherein the second guide barrel and the first cam barrel include a cam mechanism configured to rotate the first cam barrel around the optical axis direction as the second guide barrel moves in the optical axis direction.

7. The lens barrel according to claim 1, wherein the first guide barrel and the first cam barrel include a cam mechanism configured to move the first cam barrel in the optical axis direction relative to the first guide barrel as the first cam barrel rotates around the optical axis.

8. A lens barrel comprising:
a first guide barrel configured to guide linear movements of a first lens and a second lens in an optical axis direction;
a first cam barrel rotatable around an optical axis relative to the first guide barrel and including a first cam configured to move the first lens in the optical axis direction by a rotation of the first cam barrel;
a second cam barrel rotatable around the optical axis relative to the first guide barrel by the rotation of the first cam barrel, and including a second cam configured to move the second lens in the optical axis direction by a rotation of a second cam barrel;
a linear movement barrel configured to hold a third lens;
a second guide barrel whose linear movement in the optical axis direction is guided by the first guide barrel, the second guide barrel being configured to guide a linear movement of the linear movement barrel in the optical axis direction; and
an operating ring configured to rotate around the optical axis by a rotational operation,
wherein the operating ring and the second guide barrel include a cam mechanism configured to move the second guide barrel in the optical axis direction as the operating ring rotates.

9. The lens barrel according to claim 1, wherein the first cam barrel and the second cam barrel are engaged with each other so that as the first cam barrel rotates around the optical axis, the second cam barrel rotates around the optical axis.

10. The lens barrel according to claim 1, wherein the first lens includes a plurality of lens units, and
wherein the first cam barrel includes a plurality of cams serving as the first cam configured to move each of the plurality of lens units in the optical axis direction.

11. An optical apparatus comprising a lens barrel according to claim 1.

* * * * *